April 30, 1935.                W. T. ROUSE                    1,999,528
                    COMBINATION AILERON AND WING FLAP
                        Filed May 2, 1934        4 Sheets-Sheet 4
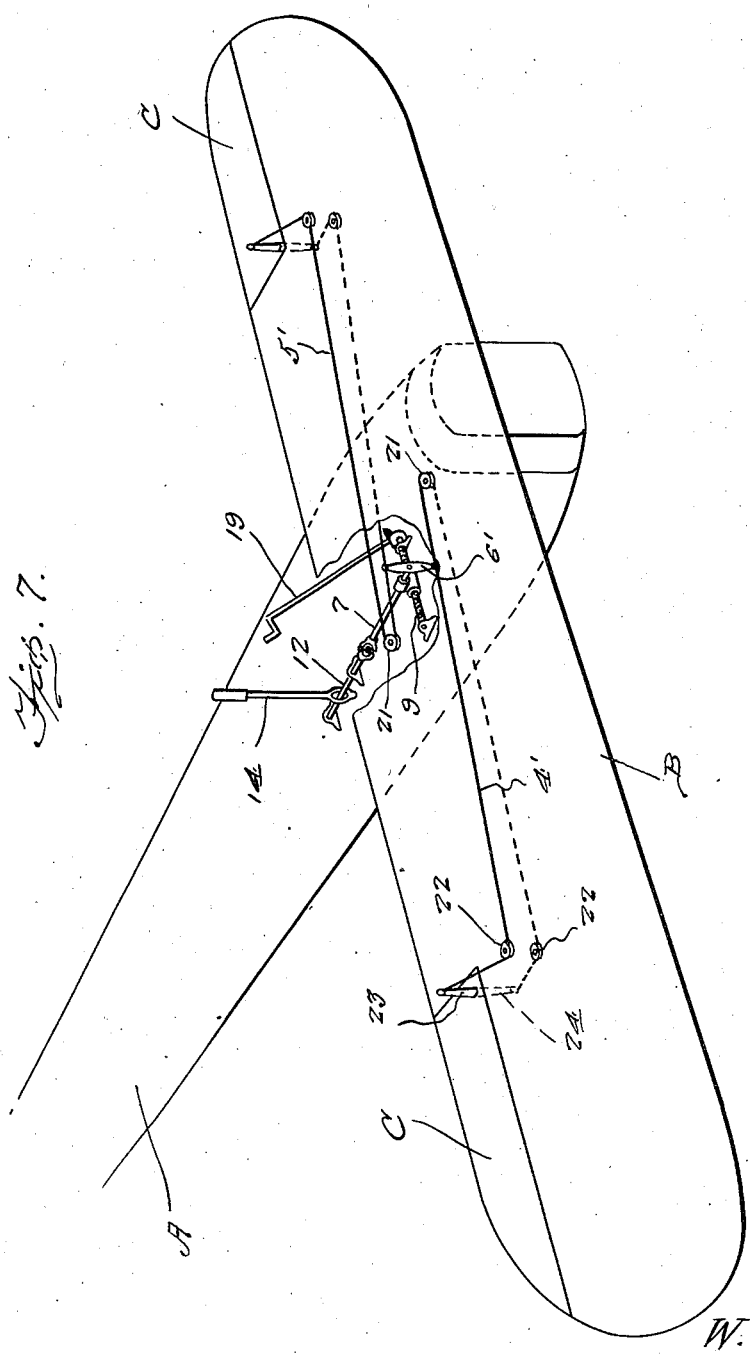
Inventor
W. T. Rouse
By Clarence A. O'Brien
                        Attorney Patented Apr. 30, 1935

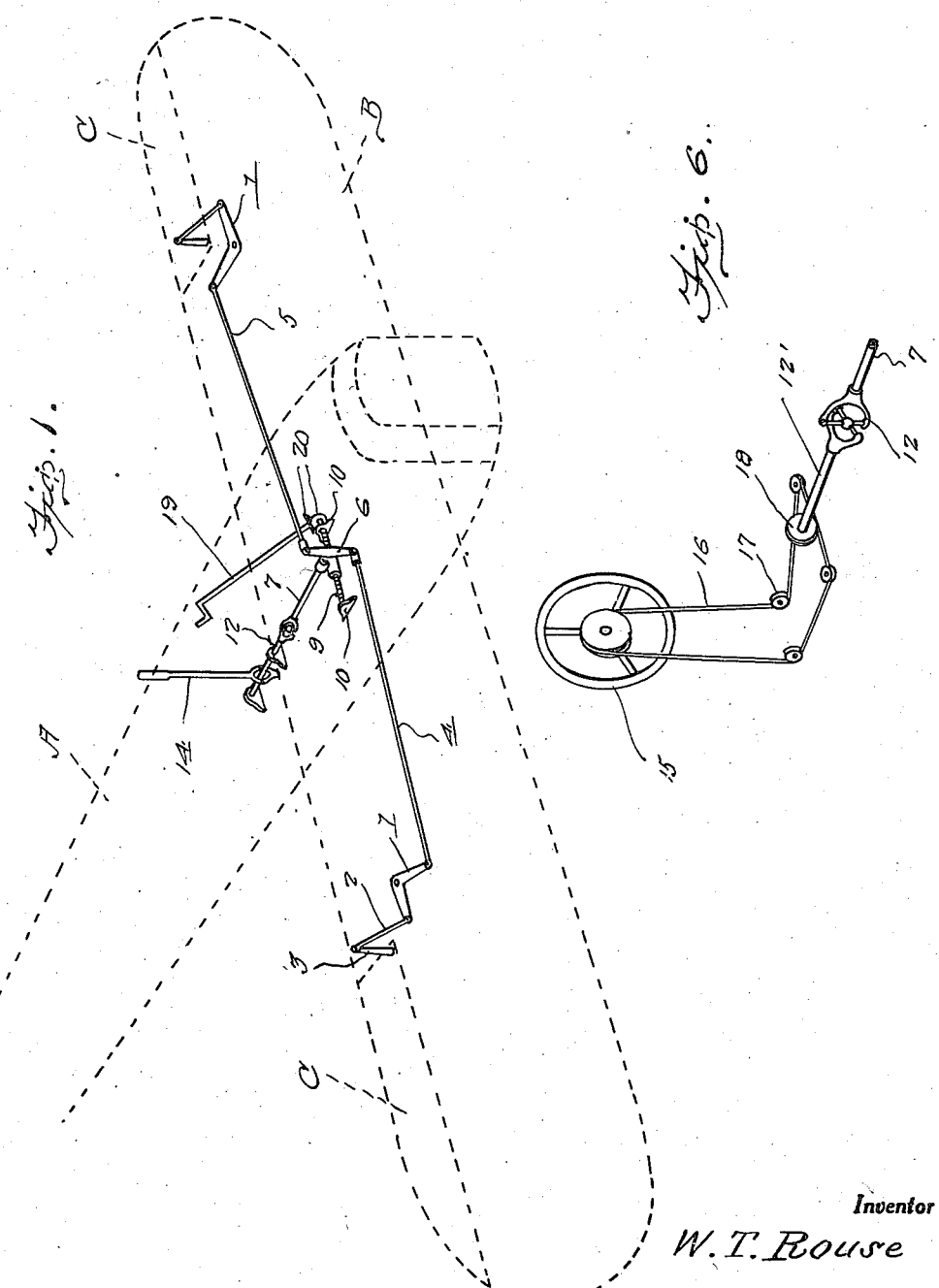

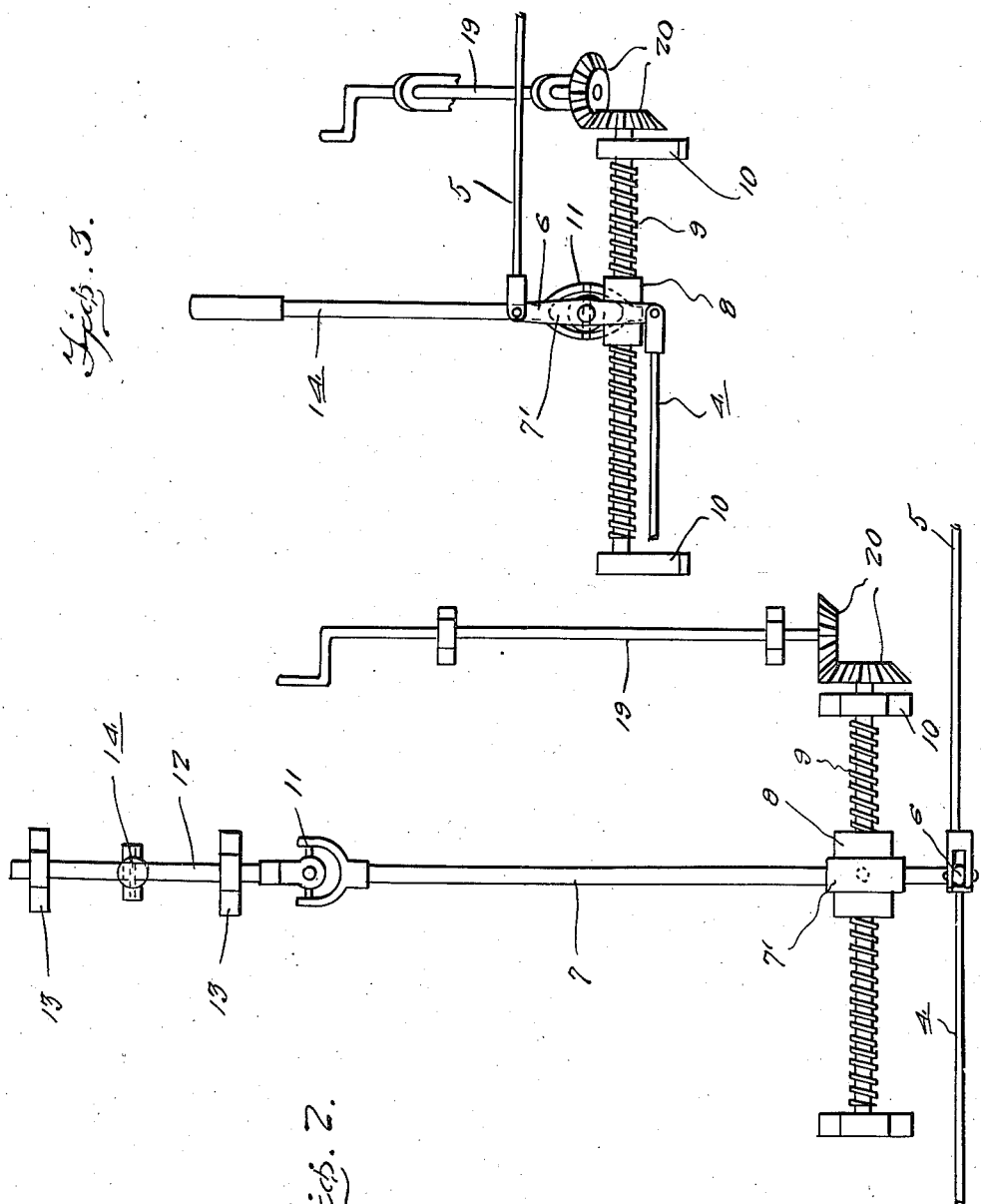

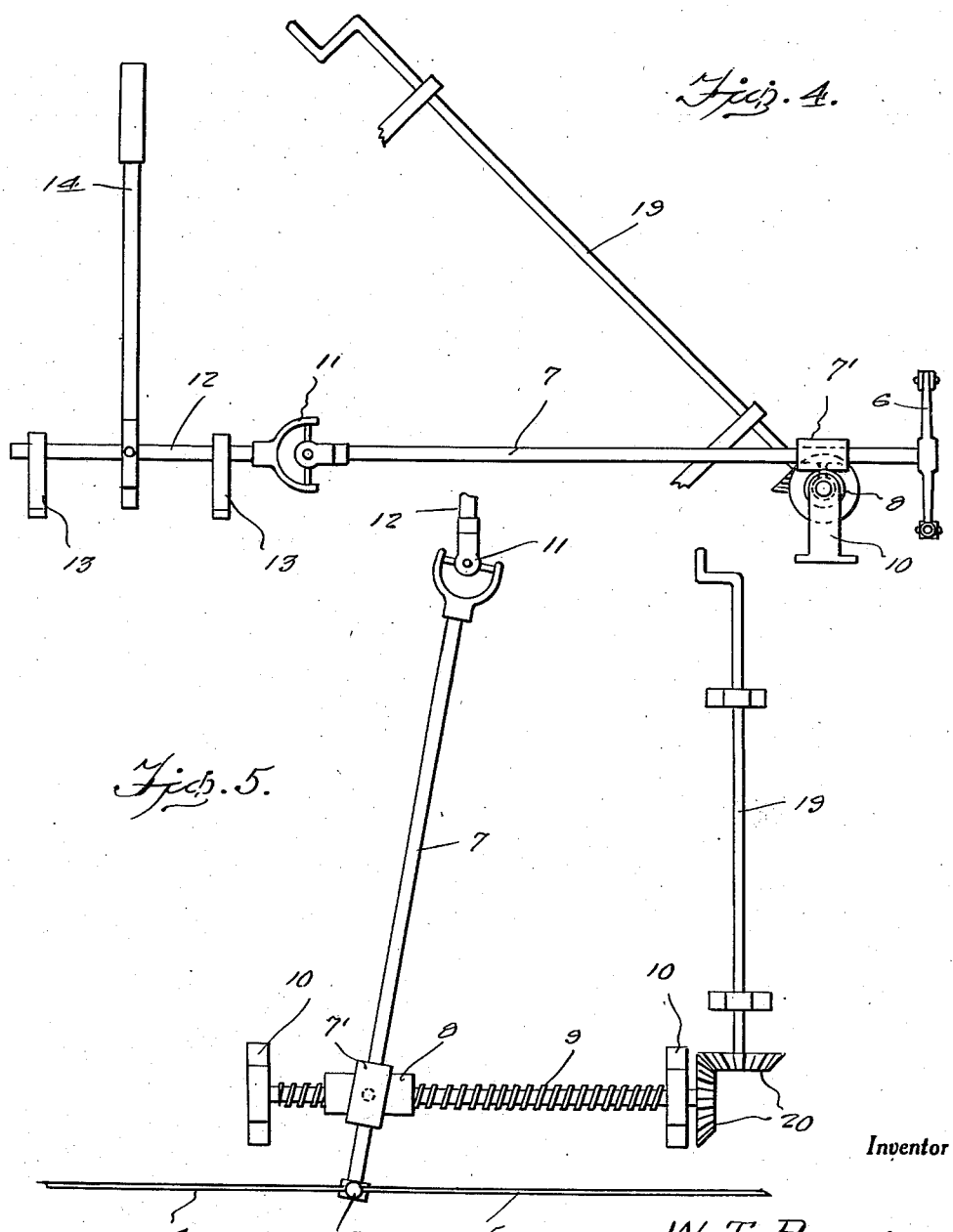

1,999,528

UNITED STATES PATENT OFFICE 1,999,528

COMBINATION AILERON AND WING FLAP

Williams Truett Rouse, Arlington, Tex.

Application May 2, 1934, Serial No. 723,556

1 Claim. (Cl. 244—29)

This invention relates to a combination aileron and wing flap for aircraft, the general object of the invention being to provide ailerons which are operated in the usual manner and means for causing the ailerons to act as flaps, when desired, such flaps increasing the lift of the wing and decreasing the landing speed.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a perspective view, showing one manner of carrying out the invention.

Figure 2 is a top plan view of the operating means.

Figure 3 is a front view of Figure 2.

Figure 4 is a side view of Figure 2.

Figure 5 is a top plan view, but showing the parts in a different position from that shown in Figure 2.

Figure 6 is a view of a modification.

Figure 7 is a perspective view showing the invention applied to an aeroplane and also showing the ailerons operated by cables instead of rods.

In these drawings, the letter A indicates the fuselage, the letter B the wing, and the letter C the ailerons. As shown in Figure 1, a pair of bell cranks 1 is pivotally carried by the wing, one adjacent each aileron, and these bell cranks are oppositely arranged, as shown, and the outer arm of each bell crank is connected by a rod 2 to the post or arm 3 of the aileron. Rods 4 and 5 are connected to the inner arms of the bell cranks, and the rod 4 is connected with the lower end of a cross head 6, while the rod 5 is connected to the upper end of said cross head. It will, of course, be understood that all of the connections are pivotal ones. The central part of this cross head is connected to the front end of a shaft 7, the front part of which passes through a bearing member 7' which is pivoted for movement about a vertical axis on a nut member 8 through which a spirally threaded shaft 9 passes, said shaft being supported for rotary movement by the bearing members 10. The rear end of the shaft is connected by a universal joint 11 with a shaft 12 rotatably supported in the bearing members 13 and this shaft is adapted to be partly rotated in one direction or the other by the usual joy stick 14 or it may be actuated by a wheel 15 through means of the cable 16 passing over the pulley 17 and over a pulley 18 attached to the end of the shaft 12', as shown in Figure 6.

A crank shaft 19 is suitably supported for rotary movement in the fuselage and is connected to the spiral or worm shaft 9 by the beveled gears 20.

Thus it will be seen that when the shaft 12 is partly rotated in one direction or the other by the stick 14 or the wheel 15, the rods 4 and 5 will be moved in opposite directions, so that the resultant movements of the bell cranks 1 will move one aileron upwardly and the other downwardly in the ordinary manner.

When the shaft 9 is turned by the crank member 19, the nut member 8 will move toward one end or the other of the shaft 9 and this member will carry the bearing member 7' with it so that the shaft 7 is tilted in one direction or the other and thus the cross head 6 is moved bodily. This results in movement of the rods 4 and 5 in the same direction so that the ailerons are either both lowered or both raised in accordance with the direction of movement of the cross head. It will be seen that when the ailerons have thus been raised or lowered, they can still be actuated by the means operated by either the stick 14 or the wheel 15.

In Figure 7, cables 4' and 5' are used instead of the rods 4 and 5, the inner ends of these cables passing over the pulleys 21 and the outer parts of the two reaches of the cables passing over the pairs of pulleys 22, one reach of each cable being connected to a top post 23 and the lower reach to a bottom post 24 of the aileron. The upper reach of the cable 4' is connected to the lower end of the cross head 6', while the lower reach of the cable 5' is connected to the upper end of the cross head. In other respects, this form of the invention is similar to that above described, and it will, of course, be understood that any suitable means may be used for connecting the cables to the ailerons.

From the foregoing, it will be seen that the ailerons can be operated in the usual manner to act as ailerons and that they can also be used as flaps for increasing the lifting power of the craft and reducing its landing speed.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In an aircraft including a wing, an aileron carried by the wing, a sectional rock shaft, a universal joint connecting the two sections together, manually operated means for rocking one section, a cross head having its central portion connected to the outer end of the second or other section, a nut member to which the outer part of said other section is pivotally connected, a screw shaft passing through the nut member and supported for rotary movement, manually operating means for rotating the screw shaft, means for connecting one end of the cross head to one aileron, means for connecting the other end of the cross head to the other aileron, such means moving the aileron in opposite directions when the shaft is rocked and moving them in the same directions when the nut member is moved by rotary movement of the screw shaft.

WILLIAMS TRUETT ROUSE.